United States Patent [19]

Chuang

[11] Patent Number: 4,830,389
[45] Date of Patent: May 16, 1989

[54] BRAKING MECHANISM FOR BICYCLE STEM

[76] Inventor: Wen L. Chuang, 2nd Fl., No. 35, Lane 244, Tunhwa N. Rd., Taipei City, Taiwan

[21] Appl. No.: 120,577

[22] Filed: Nov. 9, 1987

[51] Int. Cl.⁴ ............................................. B62L 3/02
[52] U.S. Cl. ................................ 280/264; 74/501.1; 188/24.11; 188/24.22; 280/279
[58] Field of Search ................ 280/279, 276, 264; 74/501 R, 501 A, 501 B, 501.5 R, 502, 487, 488, 489; 188/24.11, 24.12, 24.13, 24.14, 24.15, 24.16, 24.17, 24.18, 24.19, 24.20, 24.21, 24.22

[56] References Cited

U.S. PATENT DOCUMENTS 4,480,720 11/1984 Shimano ...................... 188/24.22 X
4,616,523 10/1986 Jones ................................ 280/279 X
4,653,768 3/1987 Keys et al. ...................... 74/501 R X Primary Examiner—Kenneth R. Rice
Attorney, Agent, or Firm—Klein & Vibber

[57] ABSTRACT

A sliding assembly which is slidably urgeable upwards or downwards by brake cables on a sleeve. The sleeve is fixed on the stem of a bicycle. The sliding assembly includes a slip cylinder with holes for receiving ball bearings. An outer ring encompasses the slip cylinder and an upper and a lower ring encompass and are retained by the outer cylinder. The upper ring is upwardly urgeable by a fixing piece which protrudes from an outer circumference thereof. The lower ring receives the head of the lower brake cable and is downwardly urgeable by the lower brake cable.

1 Claim, 4 Drawing Sheets

BRAKING MECHANISM FOR BICYCLE STEM

BACKGROUND OF THE INVENTION

This invention relates to a brake cable force transfer device and in particular to such a device which is slidable on the stem of a bicycle.

Brake cables have long been used in bicycles for transferring the pulling action of a user along a cable so as to increase the tension of the cable and thereby urge the brakes to close on the bicycle rim and slow the bicycle down. However, the longer the braking cable of a bicycle is, the more difficult it is for the tension of the cable to be maintained. In lieu of this problem, a new type of braking device was developed using annular rings, as shown in FIGS. 5 and 6, which divided the cable into two sections. This allowed for more accurate adjustment of the tension of the cable by providing two shorter parts and also allowed the cable to be easily changed from one side of the stem to the other side of the stem, if so desired. However, this annular ring design also had several problems. Most prominent of these is that the lower annular ring 2' and the upper annular ring 1' had a large amount of friction therebetween, thereby making the displacement of the cable difficult for the user. A second problem was that the upper annular ring 1' was only frictionally fixed in place on the bicycle stem, thereby being subject to slipping along the stem.

It is the purpose of this present invention, therefore, to mitigate and/or obviate the abovementioned drawbacks in the manner set forth in the detailed description of the preferred embodiment.

SUMMARY OF THE INVENTION

A primary objective of this invention is to provide an annular cable force transfer braking device for the stem of a bicycle which has negligible frictional losses in the parts thereof;

Another objective of this invention is to provide such a braking device which is not subject to slipping along the stem of the bicycle;

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
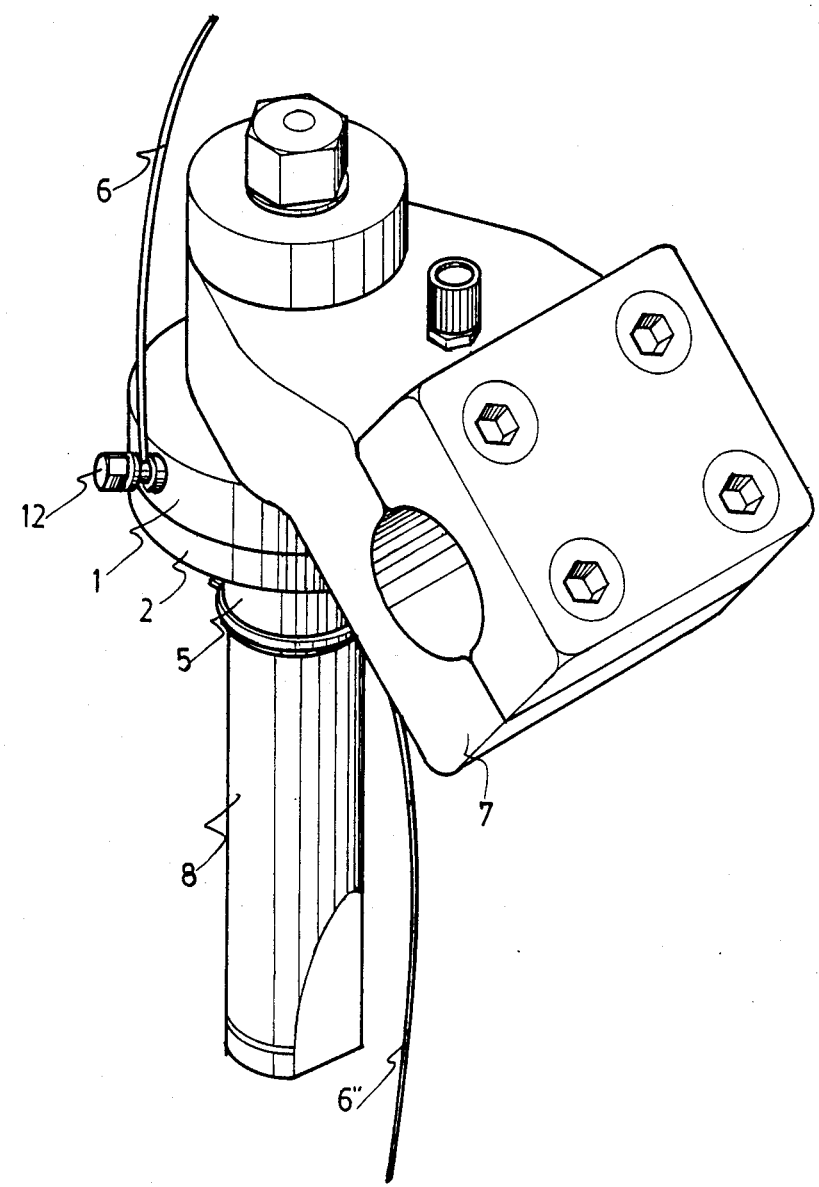
FIG. 1 is a perspective view of a bicycle braking mechanism in accordance with the present invention.

Referring to FIG. 1, it can be seen that the braking device of the present invention is positioned on the stem of a bicycle under the handlebar clamp 7 and comprises an upper ring 1 with a fixing piece 12 thereon, a lower ring 2, and a sleeve 5.

Figure 2:
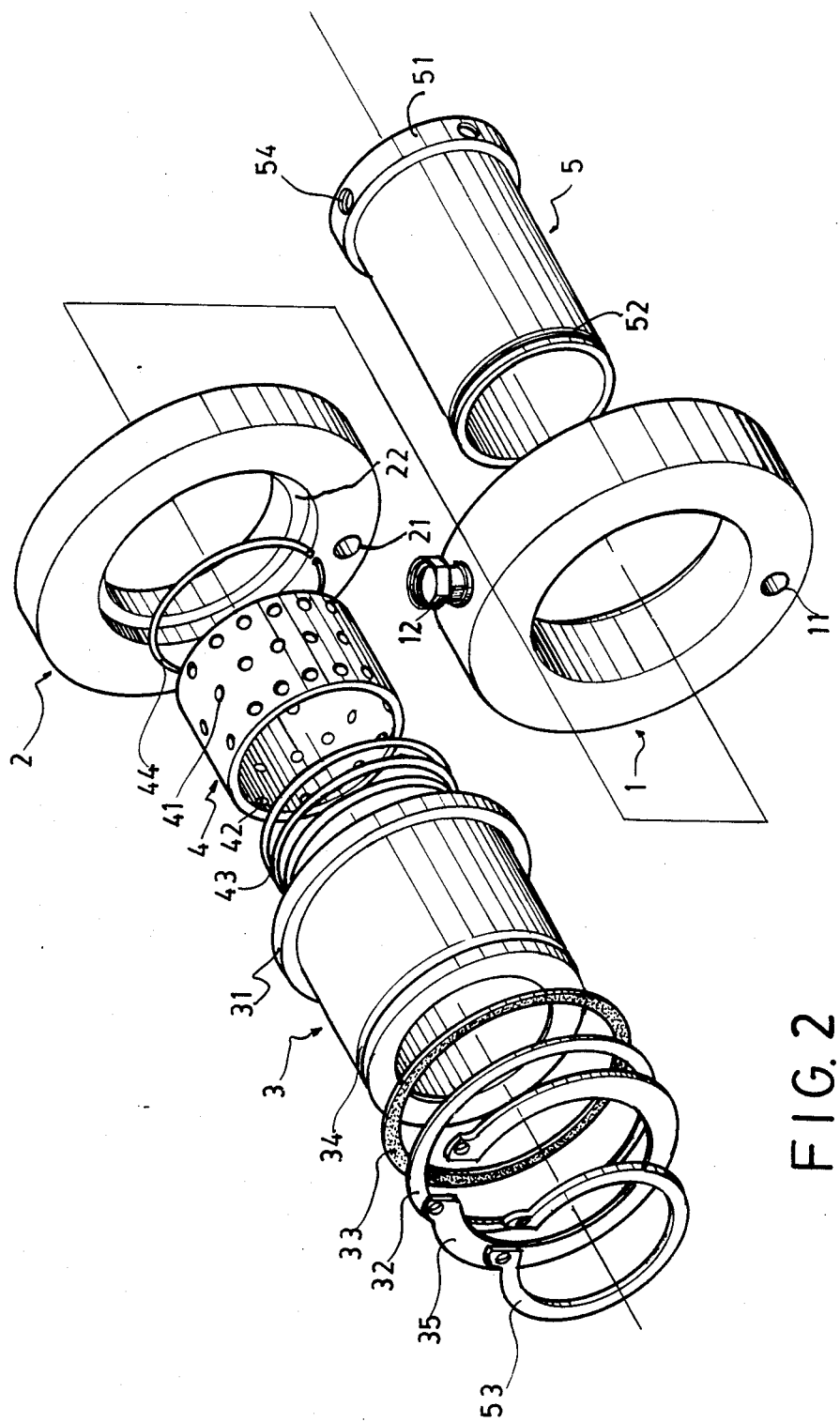
FIG. 2 is an exploded view of a braking device in accordance with the present invention.
Figure 4:
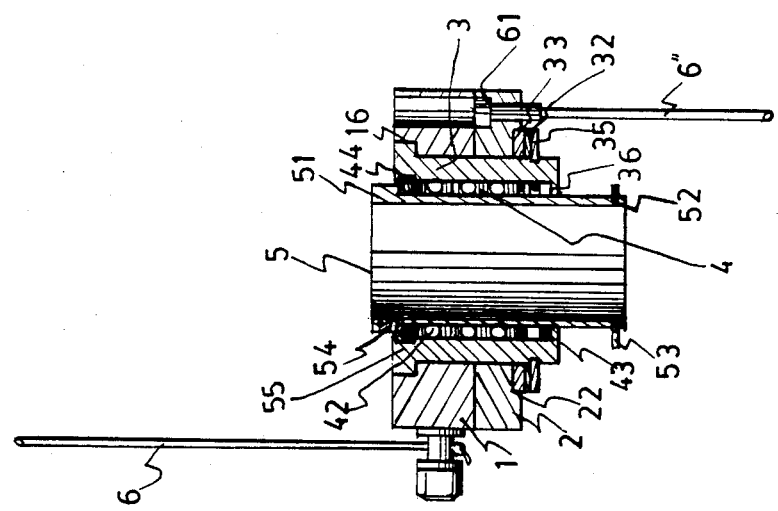
FIG. 4 is a cross-sectional view of a bicycle braking device in accordance with the present invention.
Figure 3:
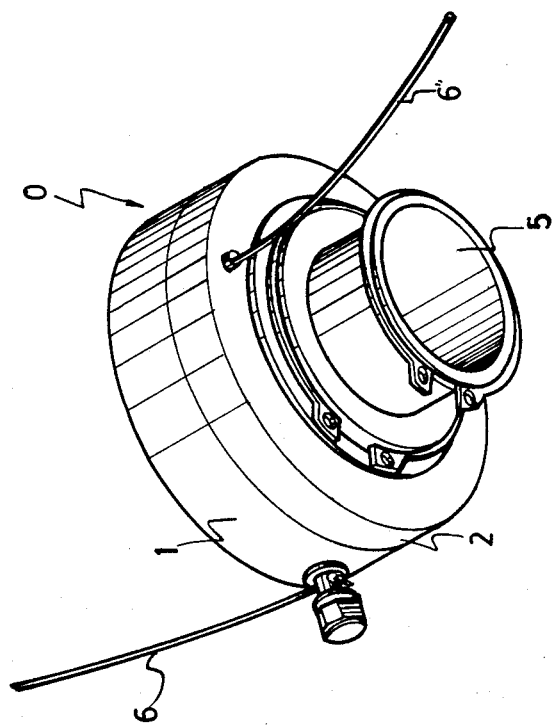
FIG. 3 is a perspective view of a braking device in accordance with the present invention.
Figure 6:
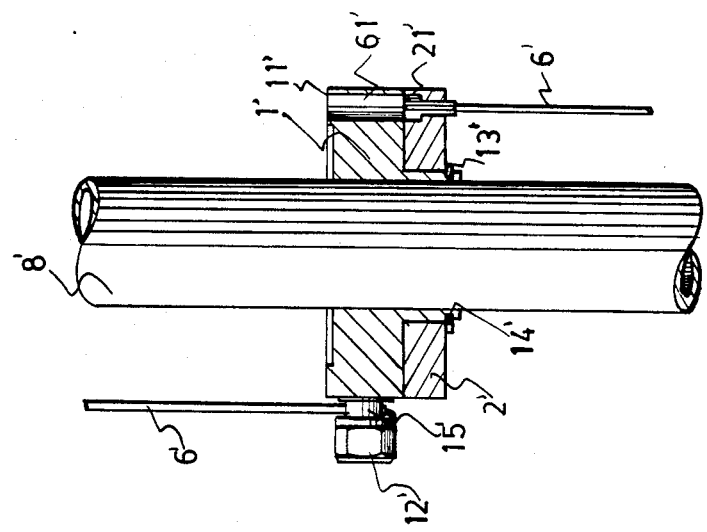
FIG. 6 is a cross-sectional view of a prior art annular ring braking device on the stem of a bicycle.
Figure 5:
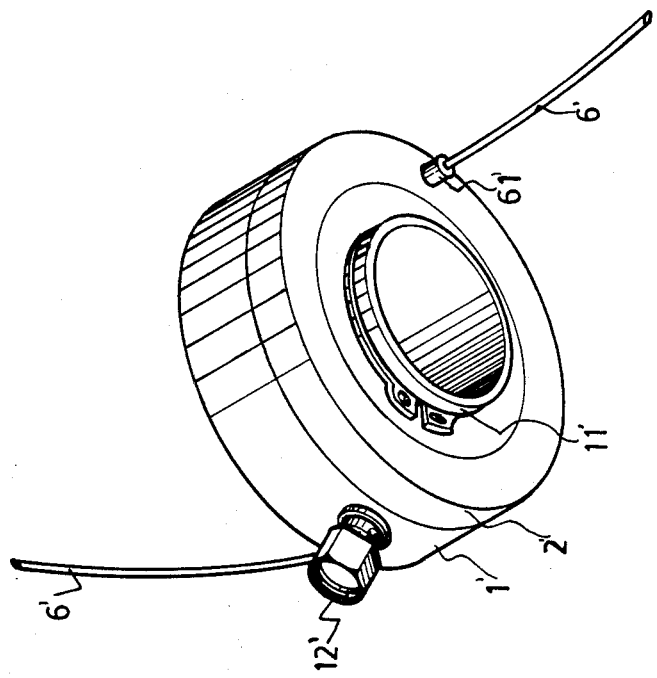
FIG. 5 is a perspective view of prior art braking device of FIG. 2.

With reference to FIG. 2 to 4, a more detailed explanation of the present invention will be given. The sleeve 5 frictionally encompasses the stem of the bicycle and has a rim 51 at the upper end thereof. It can also be seen that the sleeve 5 has a plurality of fixing holes 54 thereon for receiving screws so as to fix the sleeve 5 to the stem 8 (seen in FIG. 1) of a bicycle so that the sleeve 5 has no possibility of slipping along the stem 8. A slip cylinder 4 slidably encompasses the sleeve 5. The slip cylinder 4 has bearing holes 41 extending from the outer cylindrical surface thereof to the inner cylindrical surface thereof. These bearing holes 41 receive a respective multiplicity of ball bearings 42.

Encompassing the slip cylinder 4 is the outer cylinder 3. The outer cylinder 3 is slidable on said slip cylinder 4. The outer cylinder 3 has an inwardly protruding circular shelf on the bottom end thereof for retaining a spring 43 and the slip cylinder 4. The outer cylinder 3 also has a circular slot 55 on the upper inner circumference thereof which receives a C-ring 44. The C-ring 44 retains the slip cylinder 4 and is itself retained in an annular slot on the inside circumference of the outer cylinder 3. The outer cylinder 3 also has a flange 31 on the outer upper end thereof and a circular groove 34 on the outer lower end thereof. The circular groove 34 receives a retainer ring 35 thereon.

An upper ring 1 and a lower ring 2 encompass the outer ring 3 and are retained between the flange 31 and the retainer ring 35. The upper ring 1 has a fixing piece 12 fixed thereto which extends from the outer cylindrical surface thereof. The fixing piece 12 receives the upper brake cable 6 and is upwardly urgeable by the upper brake cable 6, which in turn is pulled by the brake lever of the bicycle by the rider of the bicycle. The upper ring 1 also has a circular seat 16 at the upper inner end thereof to receive by the flange 31.

The lower ring 2 is positioned directly below the upper ring 1. There are a cylindrical passage 21 in the lower ring 2 and a first cylindrical passage 11 in the upper ring 1; for receiving the brake cable head 61 of the lower brake cable 6'' of the bicycle. The lower ring 2 also has an annular seat 22 on a lower inner end thereof for receiving a cushion ring 33. The cushion ring 33 keeps the retainer ring 35 and an annular ring 32 therebetween from being damaged due to excessive vibration or repeated usage of the braking device. An annular groove 52 is provided on an outer end of the sleeve 5 for receiving a positioning ring 53 so that the sleeve 5 can connect with the stem 8.

The upper ring 1, lower ring 2, outer cylinder 3 and slip cylinder 4 fit together to form a sliding assembly 0. The sliding assembly 0 is upwards urgeable by the upper cable 6 so as to correspondingly urge the cable head 61 of the lower cable 6'' upwards. Since the lower cable 6'' is spring-loaded by the spring 43 of the brakes of the bicycle, when the tension is lessened on the upper cable 6, the sliding assembly 0 is urged downwards by the lower cable 6''. Therefore the sliding assembly 0 is slidable upwards or downwards along the sleeve 5, which is fixed to the stem 8 of the bicycle.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. A breaking mechanism for a stem (8) of a bicycle comprising:
   (a) a sleeve (5) for frictionally encompassing said bicycle stem (8), said sleeve (5) having a rim (51) at an upper end thereof, said rim (51) having a plurality of fixing holes (54) for receiving screws for fixing said sleeve (5) to the bicycle stem (8);
   (b) a slip cylinder (4) slidably encompassing said sleeve (5); said slip cylinder (4) having a multiplicity of evenly spaced bearing holes (41) extending from an outer cylindrical surface thereof to an inner cylindrical surface thereof, a respective multiplicity of ball bearing (42) received in said holes;
   (c) an outer cylinder (3) which is slidable on said slip cylinder (4), said outer cylinder (3) having a inwardly protruding circular shelf on a bottom end thereof for retaining a spring (43) and said slip cylinder (4) therein; said outer cylinder (3) also having a circular slot (55) on an upper inner circumference thereof for receiving a C-ring (44) for retaining said slip cylinder (4); said outer cylinder (3) also having a flange (31) on an outer upper end thereof; said outer cylinder (3) also having a circular groove (34) on an outer lower end thereof for receiving a retainer ring (35);
   (d) an upper ring (1) with a fixing piece (12) fixed thereto and extending from an outer cylindrical surface thereof, said fixing piece (12) being for receiving an upper brake cable (6) by which said upper ring (1) is urgeable upwards; said upper ring (1) also having a circular seat (16) at an upper inner end thereof to receive the flange (31) and having a first cylindrical passage (11) for receiving a brake cable head (61) of a lower brake cable (6″);
   (e) a lower ring (2) having second cylindrical passage (21) for receiving the brake cable head (61) of the lower brake cable (6″); said lower ring (2) being adjacent to said upper ring (1) in a manner that said second cylindrical passage (21) aligns with said first cylindrical passage (11); said lower ring (2) also having an annular seat (22) on a lower inner end thereof for receiving a cushion ring (33); and
   said upper ring (1), lower ring (2), outer cylinder (3), and slip cylinder (4) fitting together to form a sliding assembly (0); said sliding assembly (0) being urgeable by the upper cable (6) or the lower cable (6″) so as to correspodingly urge said cable head (61) of the lower cable (6″) upwards or downwards.

* * * * *